(12) United States Patent
Mo et al.

(10) Patent No.: US 10,133,415 B2
(45) Date of Patent: Nov. 20, 2018

(54) TOUCH DISPLAY APPARATUS, DRIVING CIRCUIT THEREOF AND DRIVING METHOD THEREFOR, AND ELECTRONIC APPARATUS

(71) Applicant: FOCALTECH ELECTRONICS, LTD., Cayman Islands (KY)

(72) Inventors: Lianghua Mo, Guangdong (CN); Xinxi Jiang, Guangdong (CN); Ningning Cai, Guangdong (CN)

(73) Assignee: FOCALTECH ELECTRONICS, LTD., Grand Cayman (KY)

( * ) Notice: Subject to any disclaimer, the term of this patent is extended or adjusted under 35 U.S.C. 154(b) by 2 days.

(21) Appl. No.: 15/123,959

(22) PCT Filed: Jun. 23, 2014

(86) PCT No.: PCT/CN2014/080501
§ 371 (c)(1),
(2) Date: Sep. 6, 2016

(87) PCT Pub. No.: WO2015/131467
PCT Pub. Date: Sep. 11, 2015

(65) Prior Publication Data
US 2017/0017345 A1    Jan. 19, 2017

(30) Foreign Application Priority Data

Mar. 7, 2014    (CN) .......................... 2014 1 0084143

(51) Int. Cl.
*G06F 3/041*    (2006.01)
*G06F 3/044*    (2006.01)

(52) U.S. Cl.
CPC ............ *G06F 3/0418* (2013.01); *G06F 3/044* (2013.01); *G06F 3/0412* (2013.01); *G09G 2310/065* (2013.01); *G09G 2340/0435* (2013.01)

(58) Field of Classification Search
CPC ...... G06F 3/0412; G06F 3/0418; G06F 3/044; G09G 2310/065; G09G 2340/0435
(Continued)

(56) References Cited

U.S. PATENT DOCUMENTS

2010/0013795 A1    1/2010    Okino
2010/0118183 A1*   5/2010    Stevens .................... G09G 5/39
                                                                    348/441
(Continued)

FOREIGN PATENT DOCUMENTS

CN    101625827 A    1/2010
CN    102339156 A    2/2012
(Continued)

OTHER PUBLICATIONS

Summary of the Chinese 1st Office Action for CN201410084143.5, dated May 19, 2017.
(Continued)

*Primary Examiner* — Michael Pervan
(74) *Attorney, Agent, or Firm* — U.S. Fairsky LLP; Yue (Robert) Xu (57) ABSTRACT

Provided is a driving circuit for a touch display apparatus. The driving circuit includes: a main control unit, providing image data for image display at a first speed; a driving unit, receiving the image data and sending display data to the touch display apparatus according to the received image data; a data buffering module, disposed in the driving unit, sending the display data at a second speed higher than the first speed, and forming, due to the difference between the (Continued)

second speed and the first speed, a pause time for stopping sending the display data to the touch display apparatus during the process that the main control unit provides the image data; and a touch detection unit, performing touch detection of the touch display apparatus in the pause time.

9 Claims, 6 Drawing Sheets

(58) Field of Classification Search
USPC .................. 178/18.01–19.07; 345/173–178
See application file for complete search history.

(56) References Cited

U.S. PATENT DOCUMENTS

| 2011/0210939 | A1* | 9/2011 | Reynolds | G06F 3/0418 |
| | | | | 345/174 |
| 2012/0056835 | A1 | 3/2012 | Choo et al. | |
| 2013/0057512 | A1 | 3/2013 | Lillie et al. | |
| 2013/0082954 | A1 | 4/2013 | Azumi et al. | |
| 2014/0176497 | A1 | 6/2014 | Mo et al. | |
| 2016/0195988 | A1* | 7/2016 | Fu | G06F 3/0416 |
| | | | | 345/174 |
| 2016/0342262 | A1* | 11/2016 | Qian | G06F 3/0416 |

FOREIGN PATENT DOCUMENTS

| CN | 102402330 A | 4/2012 |
| CN | 102884496 A | 1/2013 |
| CN | 103049126 A | 4/2013 |
| CN | 103186426 A | 7/2013 |
| CN | 103353805 A | 10/2013 |
| CN | 103376578 A | 10/2013 |
| CN | 103389848 A | 11/2013 |
| CN | 103907085 A | 7/2014 |
| JP | 2013076795 A | 4/2013 |
| TW | 201314529 A | 4/2013 |
| WO | 2013/036672 A1 | 3/2013 |

OTHER PUBLICATIONS

International Search Report for PCT/CN2014/080501, dated Dec. 12, 2014, ISA/CN.
Japanese Office Action of counterpart application.

* cited by examiner

TOUCH DISPLAY APPARATUS, DRIVING CIRCUIT THEREOF AND DRIVING METHOD THEREFOR, AND ELECTRONIC APPARATUS

The present application is the national phase of International Application No. PCT/CN2014/080501, titled "TOUCH DISPLAY APPARATUS, DRIVING CIRCUIT THEREFOR AND DRIVING METHOD THEREFOR, AND ELECTRONIC APPARATUS", filed on Jun. 23, 2014, which claims priority to Chinese Patent Application No. 201410084143.5, titled "TOUCH DISPLAY APPARATUS, DRIVING CIRCUIT THEREFOR AND DRIVING METHOD THEREFOR, AND ELECTRONIC DEVICE", filed on Mar. 7, 2014 with the State Intellectual Property Office of People's Republic of China, both of which are incorporated herein by reference in entireties.

FIELD

The present disclosure relates to the technical field of touch control, and in particular to a touch display apparatus, a driving circuit for the touch display apparatus, a driving method for the touch display apparatus and an electronic device.

BACKGROUND

With an increasing requirement for a lighter and thinner touch display apparatus, a distance between a display screen and a touch screen becomes smaller and smaller. As a result, a signal driving the display screen to display is prone to be coupled as a noise signal to the touch screen, resulting in an erroneous report of touch detection. Furthermore, an actuating signal sent in touch detection also is prone to be coupled as a noise signal to the display screen, resulting in an abnormal display.

SUMMARY

The object of the present disclosure is to provide a touch display apparatus, a driving circuit for the touch display apparatus, a driving method for the touch display apparatus and an electronic device, in order to improve a report rate of touch detection while reducing interference between display drive and the touch detection.

In order to achieve the above object, a driving circuit for a touch display apparatus is provided according to the present disclosure. The touch display apparatus is configured to perform touch detection and image display, and the driving circuit includes: a main control unit, a driving unit, a data buffering module and a touch detection unit. The main control unit is configured to provide image data for image display at a first speed. The driving unit is configured to receive the image data provided by the main control unit and send display data to the touch display apparatus based on the received image data. The data buffering module is arranged in the driving unit and configured to send the display data to the touch display apparatus at a second speed higher than the first speed to cause the touch display apparatus to perform the image display, and form, based on a difference between the second speed and the first speed, a pause time period for stopping sending the display data to the touch display apparatus during a process that the main control unit provides the image data. The touch detection unit is configured to perform the touch detection of the touch display apparatus in the pause time period formed by the data buffering module.

Optionally, the data buffering module includes: a memory, and a timing controller. The memory is configured to buffer the image data provided by the main control unit. The timing controller is configured to control the display data from the memory to be sent to the touch display apparatus at the second speed higher than the first speed.

Optionally, the touch display apparatus is provided with multiple gate lines arranged in a row direction and multiple data lines arranged in a column direction; the driving unit is configured to drive the gate lines row by row, and send the display data to a column of the data lines after each row of the gate lines driven, to send each row of the display data; and the pause time period formed by the data buffering module is at least longer than a time period for sending one row of the display data.

Optionally, the touch display apparatus is provided with multiple gate lines arranged in a row direction and multiple data lines arranged in a column direction; the driving unit is configured to drive the gate lines row by row, and send the display data to the data lines after each row of the gate lines is driven, to send each row of the display data; and the second speed at which the data buffering module sends the display data to the touch display apparatus equals to an average speed at which multiple rows of the display data are sent.

Optionally, the driving unit is configured to send display data of each frame of image to the touch display apparatus to display the frame of image, and is further configured to form a blank time period before or after the frame of image is displayed; and the touch detection unit is further configured to perform the touch detection of the touch display apparatus in the blank time period.

Optionally, the touch display apparatus is a capacitive touch display apparatus including multiple touch detection electrodes; and the touch detection unit is configured to detect self-capacitance of the touch detection electrodes or detect mutual capacitance between the touch detection electrodes in the pause time period formed by the data buffering module.

Optionally, the data buffering module is configured to form one or more pause time periods for stopping sending the display data to the touch display apparatus during a process that the main control unit provides each frame of the image data; and the touch detection unit is configured to perform the touch detection of the touch display apparatus in the one or more pause time periods formed by the data buffering module.

Accordingly, a driving method for a touch display apparatus is further provided according to the present disclosure. The touch display apparatus is configured to perform touch detection and image display, and the driving method includes: providing image data for image display at a first speed; receiving the image data transmitted at the first speed and sending display data to the touch display apparatus at a second speed higher than the first speed based on the received image data to cause the touch display apparatus to perform the image display, and forming, based on a difference between the second speed and the first speed, a pause time period for stopping sending the display data to the touch display apparatus during a process that the display data are transmitted at the second speed; and performing the touch detection of the touch display apparatus in the pause time period.

Optionally, the step of receiving the image data transmitted at the first speed and sending display data to the touch display apparatus at a second speed higher than the first speed based on the received image data includes: receiving and buffering the image data at the first speed, and sending the display data to the touch display apparatus at the second speed higher than the first speed based on the buffered image data.

Optionally, the touch display apparatus is provided with multiple gate lines arranged in a row direction and multiple data lines arranged in a column direction; the step of sending the display data to the touch display apparatus includes: driving the gate lines row by row, and sending the display data to the data lines after each row of the gate lines is driven, to send each row of the display data; and the pause time period is at least longer than a time period for sending one row of the display data.

Optionally, the touch display apparatus is provided with multiple gate lines arranged in a row direction and multiple data lines arranged in a column direction; the step of sending the display data to the touch display apparatus at a second speed higher than the first speed includes: driving the gate lines row by row, and sending the display data to the data lines after each row of the gate lines is driven, to send each row of the display data; and the second speed equals to an average speed at which multiple rows of the display data are sent.

Optionally, the step of sending the display data to the touch display apparatus at the second speed higher than the first speed includes: sending the display data of each frame of image to the touch display apparatus to display the frame of image; and forming a blank time period before or after the frame of image is displayed; and the driving method further includes performing the touch detection of the touch display apparatus in the blank time period.

Optionally, the touch display apparatus is a capacitive touch display apparatus including multiple touch detection electrodes; and the step of performing the touch detection of the touch display apparatus in the pause time period includes: detecting self-capacitance of the touch detection electrodes or detecting mutual capacitance between the touch detection electrodes in the pause time period.

Optionally, the step of sending the display data to the touch display apparatus at a second speed higher than the first speed includes: forming one or more pause time periods for stopping sending the display data to the touch display apparatus during a process for providing display data of a frame of image; and the step of performing the touch detection of the touch display apparatus in the pause time period includes: performing the touch detection of the touch display apparatus in the one or more pause time periods.

Accordingly, a touch display apparatus is further provided according to the present disclosure. The touch display apparatus includes: a touch display panel and a driving circuit. The touch display panel is configured to perform touch detection and image display. The driving circuit is configured to drive the touch display panel to perform the touch detection and the image display, and the driving circuit is the driving circuit according to the present disclosure.

Accordingly, a driving circuit for a touch display apparatus is further provided according to the present disclosure. The touch display apparatus is configured to perform touch detection and image display, and the driving circuit includes: a driving unit and a touch detection unit. The driving unit is configured to provide display data to the touch display apparatus for displaying an image, the driving unit is configured to provide the display data section by section to the touch display apparatus for displaying a frame of the image, and the driving unit is configured to stop sending the display data to the touch display apparatus for a predetermined time period between time periods for sending sections of the image data. The touch detection unit is configured to perform the touch detection of the touch display apparatus in the predetermined time period.

Optionally, the touch display apparatus is provided with multiple gate lines arranged in a row direction and multiple data lines arranged in a column direction; the driving unit is configured to drive the gate lines row by row, and send the display data to a column of the data lines after driving each row of the gate lines, to send each row of the display data; and the predetermined time period is at least longer than a time period for sending one row of the display data.

Optionally, the predetermined time period is longer than a time period for sending ten rows of the display data.

Optionally, the driving circuit further includes a main control unit connected to the driving unit, and the main control unit is configured to provide image data for image display at a first speed; and the diving unit is configured to receive the image data provided by the main control unit, and send the display data to the touch display apparatus based on the received image data, where the diving unit is configured to send the display data to the touch display apparatus at a second speed higher than the first speed, and form, based on a difference between the second speed and the first speed, the predetermined time period for stopping sending the display data to the touch display apparatus during a process that the main control unit provides the image data.

Optionally, the driving circuit further includes a main control unit connected to the driving unit, and the main control unit is configured to provide the image data section by section to the driving unit, and stop sending the image data to the driving unit for the predetermined time period between time periods for sending sections of the image data; and the driving unit is configured to, after receiving the image data, output correspondingly the display data to the touch display apparatus based on the received image data.

Optionally, the main control unit is configured to transmit the image data at a first speed, the driving unit is configured to transmit the display data at a second speed, and the second speed equals to the first speed.

Accordingly, a touch display apparatus is further provided according to the present disclosure. The touch display apparatus includes: a touch display panel and a driving circuit. The touch display panel is configured to perform touch detection and image display. The driving circuit is configured to drive the touch display panel to perform the touch detection and the image display, and the driving circuit is the driving circuit according to the present disclosure.

Optionally, the driving unit of the driving circuit is further configured to form a blank time period before or after each frame of image is displayed, and the touch detection unit is further configured to perform the touch detection of the touch display apparatus in the blank time period.

Optionally, the touch display panel is a capacitive touch display panel including multiple touch detection electrodes, and the touch detection unit is configured to detect self-capacitance of the touch detection electrodes or detect mutual capacitance between the touch detection electrodes in the predetermined time period.

Accordingly, an electronic device is further provided according to the present disclosure. The electronic device includes: a first apparatus; and a second apparatus coordinating with the first apparatus, and the first apparatus is the touch display apparatus according to the present disclosure.

Compared with the conventional technology, the technical solution of the present disclosure has advantages as follows.

In the driving circuit for the touch display apparatus according to the present disclosure, since the second speed at which the data buffering module sends the display data is higher than the first speed at which the image data are received, the data buffering module has a time period in which the display data have been sent to the touch display apparatus completely while new image data have not arrived. The time period is formed as the pause time period for stopping sending the display data. The touch detection is performed in the pause time period. Since the data buffering module sends no display data to the touch display apparatus in the pause time period, interference between the display drive and the touch detection can be reduced. Furthermore, based on the amount of display data to be sent and by setting differently the first speed and the second speed, one or more pause time periods may be formed during a process of displaying a frame of image with the touch display apparatus, so that the touch detection may be performed one or more times by the touch detection unit during the process that the touch display apparatus displays the frame of image, which improves the report rate.

The driving circuit for the touch display apparatus is further provided according to the present disclosure. The driving unit in the driving circuit is configured to provide the display data section by section to the touch display apparatus for displaying a frame of the image, and stop sending the display data to the touch display apparatus for a predetermined time period between time periods for sending sections of the image data. The touch detection unit is configured to perform the touch detection of the touch display apparatus in the predetermined time period. In the predetermined time period, the driving unit sends no display data, therefore, interference on the touch detection, which is caused by the process of sending the display data, can be reduced.

The touch display apparatus according to the present disclosure includes the driving circuit, which may perform the touch detection in the time period for stopping sending the display data during the process of displaying a frame of image. Therefore, interference on the touch detection, which is caused by sending the display data, can be reduced while the image display is not affected. Thus, the touch display apparatus has excellent performances of both display and touch detection.

DETAILED DESCRIPTION OF EMBODIMENTS

In order that the above object, features and advantages of the present disclosure can be more apparent and be better understood, in the following, embodiments of the present disclosure are described in detail in conjunction with the accompanying drawings.

Figure 1:
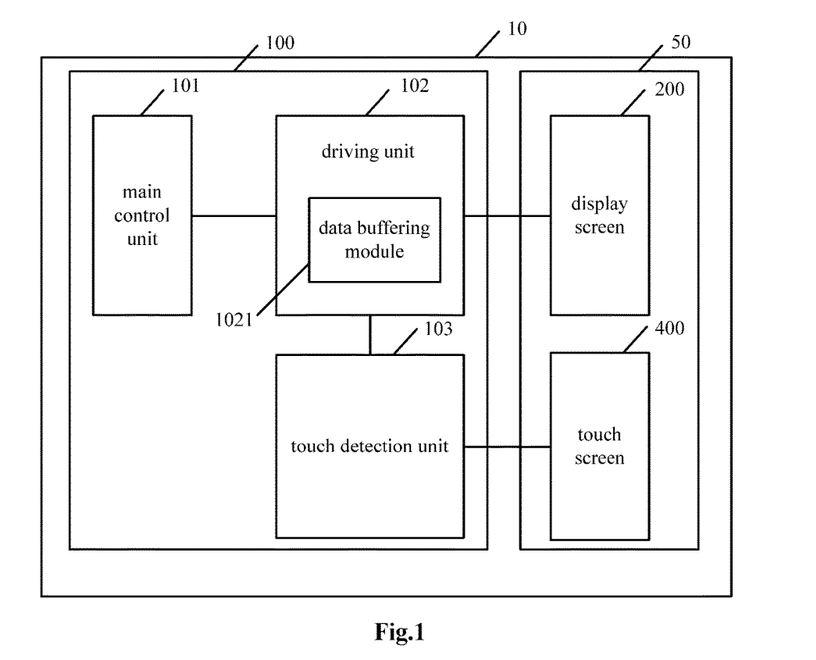
FIG. 1 is a functional block diagram of a touch display apparatus according to an embodiment of the present disclosure.

FIG. 1 shows a functional block diagram of a touch display apparatus according to an embodiment of the present disclosure. The touch display apparatus 10 includes a touch display panel 50.

The touch display panel 50 is configured to perform touch detection and image display.

In the embodiment, the touch display panel 50 includes a touch screen 400 for performing the touch detection and a display screen 200 for performing the image display. It should be noted that FIG. 1 is merely a functional block diagram, and in practice, the touch screen 400 for performing touch detection and the display screen 200 for performing image display may be embodied as two components separated to each other, or two components sharing a part of elements, or may be embodied in a one-piece structure. In a case that the touch screen 400 and the display screen 200 are embodied in a one-piece structure, the display screen 200 has functions of both the touch screen 400 and the display screen 200, and thus there is no need to produce the touch screen 400.

The touch display apparatus 10 further includes a driving circuit 100 configured to drive the touch screen 400 to perform the touch detection and drive the display screen 200 to perform the image display.

The driving circuit 100 includes a main control unit 101, a driving unit 102 and a touch detection unit 103. The driving unit 102 is connected to the main control unit 101, the touch detection unit 103 and the display screen 200. The touch detection unit 103 is further connected to the touch screen 400.

The main control unit 101 is configured to provide image data for image display to the touch display panel 50 at a first speed.

Specifically, the main control unit (host) 101 is configured to process an image (for example, converting data in the YUV format into data in the RGB format, and zooming) and transmit image data for image display. In the embodiment, the main control unit 101 transmits the image data at the first speed, which may be a normal data transmission speed of the main control unit 101. Furthermore, the main control unit 101 is further configured to send control data to control a driving process. Here, the main control unit 101 has the same functions, structures and parameters as those in the conventional technology, which are not described.

The driving unit 102 is configured to receive the image data provided by the main control unit 101 and send display data to the touch display screen 200 based on the received image data.

Specifically, the driving unit 102 is configured to receive the image data sent by the main control unit 101 at the first speed, process the image data (for example, change or optimal a color), convert the image data into the display data, and send the display data to the display screen 200. The driving unit 102 is configured to send the display data to the display screen 200 at a second speed higher than the first speed.

A data buffering module 1021 is arranged in the driving unit 102 and is configured to send the display data to the display screen 200 at the second speed higher than the first speed to cause the display screen 200 to perform the image display. The data buffering module 1021 is further configured to form, based on a difference between the second speed and the first speed, a pause time period for stopping sending the display data to the display screen 200 during a process that the main control unit 101 provides the image data.

Since the second speed at which the data buffering module 1021 sends the display data is higher than the first speed at which the image data are received, the data buffering module 1021 has a time period in which the display data have been sent to the display screen 200 completely while new image data have not arrived, which is used as the pause time period. During the pause time period, the main control unit 101 still sends the image data to the driving unit 102 (more specifically, the data buffering module 1021), while the data buffering module 1021 does not send any display data to the display screen 200.

Figure 2:
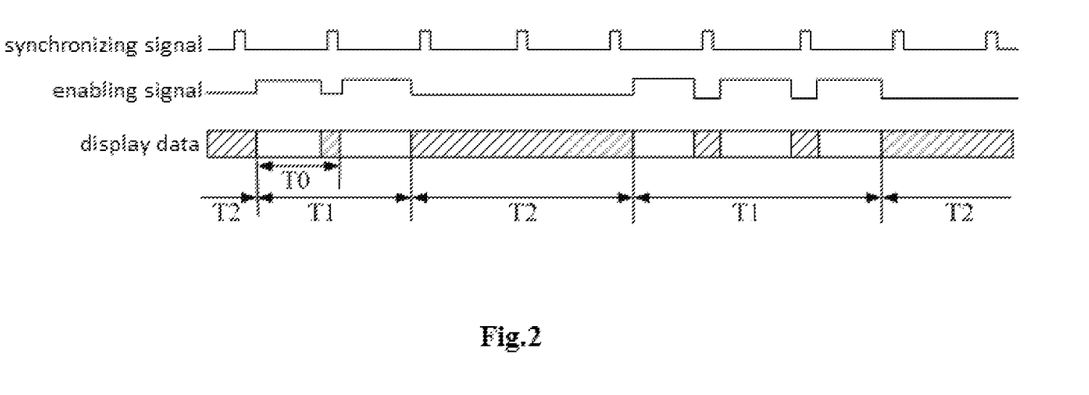
FIG. 2 is a schematic diagram of signals in a driving circuit for the touch display apparatus as shown in FIG. 1.

Reference is made to FIG. 2, which is a schematic diagram of signals in the driving circuit 100. The data buffering module 1021 may send the display data to the display screen 200 section by section, and form the pause time period for stopping sending the display data to the display screen 200 between time periods for sending sections of the image data. In FIG. 2, T1 represents a time period for sending the display data to the display screen 200, and T2 represents a pause time period for stopping sending the display data to the display screen 200.

The touch detection unit 103 is configured to perform the touch detection of the touch screen 400 in the pause time period T2 formed by the data buffering module 1021.

Since the data buffering module 1021 stops sending the display data to the display screen 200 during the pause time period T2, the effect on the touch detection of the touch detection unit 103, which is caused by a display driving process of providing the display data to the display screen 200, can be reduced with the driving circuit 100 according to the embodiment. Accordingly, interference of the touch detection on the display driving process can be reduced.

Figure 3:
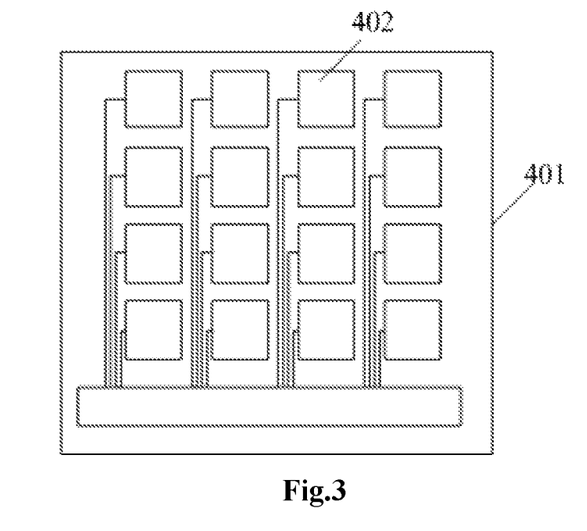
FIG. 3 is a schematic diagram of a touch screen of the touch display apparatus as shown in FIG. 1.

Reference is made to FIG. 3, which is a structural schematic diagram of the touch screen 400 as shown in FIG. 1. The touch screen 400 may be a capacitive touch screen 401 (that is, the touch display panel 50 is a capacitive touch display panel, and the touch display apparatus is a capacitive touch display apparatus). The capacitive touch screen 401 includes multiple touch detection electrodes 402.

For example, in a case that the touch screen 400 is a self-capacitive touch screen 401, the touch detection unit 103 is configured to detect self-capacitance of the touch detection electrodes 402 in the pause time period formed by the data buffering module 1021. Alternatively, in a case that the touch screen 400 is a mutual-capacitive touch screen 401, the touch detection unit 103 is configured to detect mutual capacitance between the touch detection electrodes 402. However, the touch screen 400 is not limited to the capacitive touch screen 401 in the present disclosure, and may be a touch screen based on other touch detection principles in another embodiment.

Furthermore, based on the amount of display data to be sent and by setting differently the first speed and the second speed, one or more pause time periods may be formed during a process that the display screen 200 displays a frame of image, so that the touch detection may be performed one or more times by the touch detection unit 103 during the process that the display screen 200 displays the frame of image. In the embodiment, the report rate is improved by configuring multiple touch detection during the process of displaying a frame of image.

Figure 4:
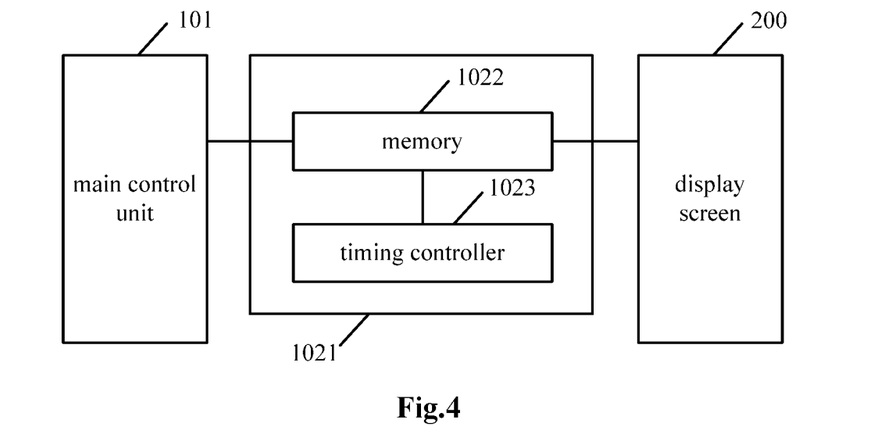
FIG. 4 is a schematic diagram of a data buffering module of a driving circuit for the touch display apparatus as shown in FIG. 1.

Reference is made to FIG. 4, which is a functional block diagram of the data buffering module 1021 as shown in FIG. 1. The data buffering module 1021 may include a memory 1022 and a timing controller 1023.

The memory 1022 is configured to buffer the image data provided by the main control unit 101.

The timing controller 1023 is configured to control the display data from the memory 1022 to be sent to the display screen 200 at the second speed higher than the first speed.

The timing of forming the pause time period may be better controlled by buffering the image data in the memory 1022. For example, the memory is capable of storing 50 rows of image data. In displaying a frame of image, the main control unit 101 sends 50 rows of image data of a frame of image to the driving unit 102 at the first speed (v). The memory 1022 of the data buffering module 1021 in the driving unit 102 buffers the 50 rows of image data at the first speed. The timing controller 1023 causes the 50 rows of image data to be sent to the display screen 200 at the second speed (3v) which is three times the first speed. Each time when the data buffering module 1021 sends 50 rows of display data, a pause time period having a duration of (the amount of 50 rows of image data/v minus the amount of 50 rows of display data/3v) is formed. The pause time period is sufficient for the touch detection unit 103 to perform the touch detection at least once.

In practice, the timing controller 1023 may send a notification of starting a pause time period to the touch detection unit 103 after the 50 rows of display data buffered in the memory are sent completely. The touch detection unit 103 may perform the touch detection based on the notification of starting a pause time period.

Here, the data buffering module 1021 including the memory 1022 and the timing controller 1023 is described as an example, but the present disclosure is not limited thereto. The data buffering module 1021 may be in other structures.

Figure 5:
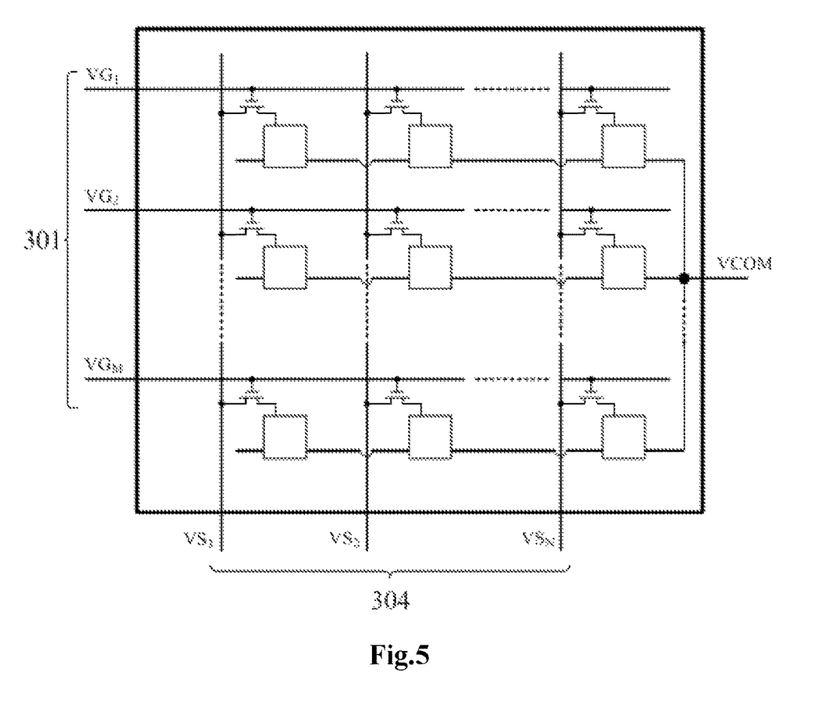
FIG. 5 is a schematic diagram of a display screen of the touch display apparatus as shown in FIG. 1.

Reference is made to FIG. 5, which is a schematic diagram of the display screen 200 as shown in FIG. 1. The display screen 200 is provided with multiple gate lines 301 arranged in a row direction and multiple data lines 304 arranged in a column direction. The driving unit 102, when sending the display data to the display screen 200, drives the gate lines row by row, and sends the display data to a column of the data lines after each row of the gate lines is driven, to send each row of the display data.

Optionally, referring to FIG. 2 again, the pause time period T2 formed by the data buffering module 1021 is at least longer than a time period T0 for sending one row of the display data.

During the time period T0 for sending one row of the display data, the row of the display data sent by the driving unit 102 to the display screen 200 includes valid display data (i.e., the white section within T0) and non-display data (i.e., the shaded section within T0). The time period for transmitting the non-display data is too short for the touch detection unit 103 to perform the touch detection once.

By causing the pause time period T2 to be at least longer than the time period for sending one row of the display data, which is far longer than a time period for sending the non-display data, the pause time period is sufficient for the touch screen 400 to perform the touch detection at least once.

Optionally, the second speed at which the data buffering module 1021 sends the display data to the display screen 200 equals to an average speed at which multiple rows of the display data are sent. This is because speeds at which the driving unit 102 sends different rows of the display data vary slightly from each other, and the data buffering module 1021 can form the pause time period as long as the average speed for sending multiple rows of the display data is higher than the first speed. For example, the second speed equals to an average speed at which 3 rows of display data are sent, which is higher than the first speed, in order to form the pause time period sufficient for the touch detection unit to perform the touch detection at least once.

In the above embodiment, the touch detection unit 103 is configured to perform the touch detection of the display screen 400 in the pause time period formed by the data buffering module 1021, but the present disclosure is not limited thereto. In other embodiments, the touch detection unit 103 may perform the touch detection in other time periods in which no display data is sent to the display screen 200, in addition to the pause time period.

Figure 6:
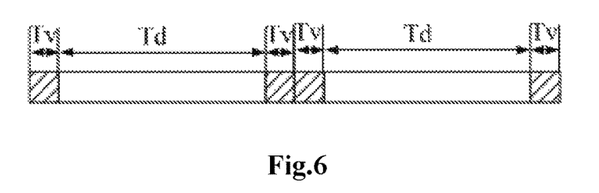
FIG. 6 is another schematic diagram of signals in a driving circuit for the touch display apparatus as shown in FIG. 1.

Reference is made to FIG. 6, which is another schematic diagram of signals in the driving circuit as shown in FIG. 1.

It should be noted that, in displaying each frame of image on the display screen 200 under the control of the driving unit 102, not only a time period Td is formed for sending display data of the frame of image to the display screen 200 to display the frame of image, but also a blank time period Tv is formed before or after the time period Td. It also should be noted that, according to different designs for the driving circuit, the driving unit 102 may send no signal to the display screen 200 or may send a non-display signal not to be displayed, such as a capacitor pre-charging signal, to the display screen 200 in the blank time period Tv.

The touch detection unit 103 may perform the touch detection of the touch screen 400 in the blank time period Tv in addition to the pause time period, which may also reduce the interference between the touch detection and the display drive, and improve the report rate.

Here, it is described that the touch detection unit 103 performs the touch detection in the blank time period Tv as an example. In other embodiments, the touch detection unit 103 may perform the touch detection in other time periods in which no display data is sent to the display screen 200, in addition to the pause time period.

Figure 7:
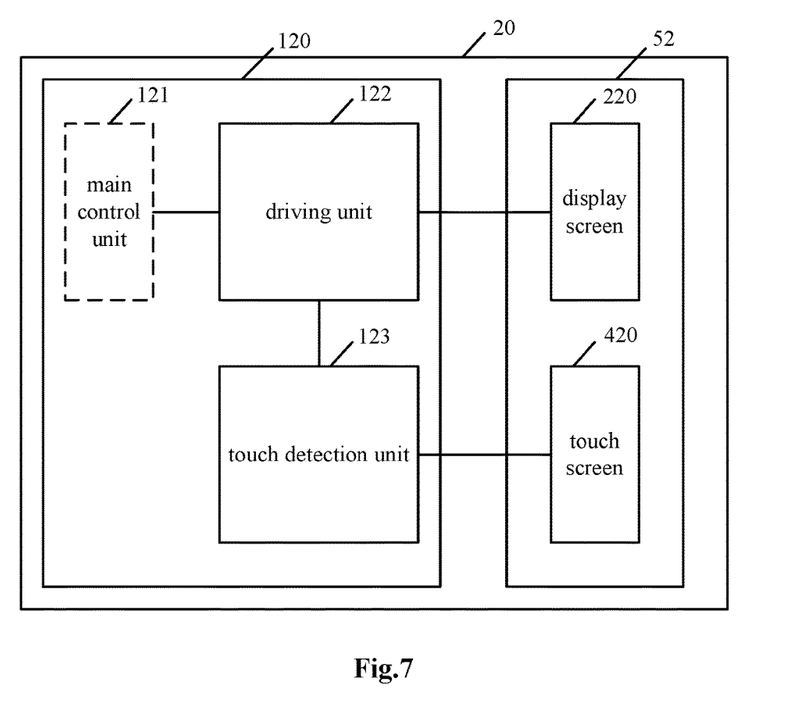
FIG. 7 is a functional block diagram of a touch display apparatus according to an embodiment of the present disclosure.

It should be noted that, a touch display apparatus is further provided according to the present disclosure. Reference is made to FIG. 7, which is a schematic diagram of a touch display apparatus according to an embodiment of the present disclosure. The touch display apparatus 20 includes a touch display panel 52.

The touch display panel 52 is configured to perform touch detection and image display.

In the embodiment, the touch display panel 52 includes a touch screen 420 for performing the touch detection and a display screen 220 for performing the image display. It should be noted that FIG. 7 is merely a functional block diagram, and in practice, the touch screen 420 for performing the touch detection and the display screen 220 for performing the image display may be embodied as two components separated to each other, or two components sharing a part of elements, or may be embodied in a one-piece structure. In a case that the touch screen 420 and the display screen 220 are embodied in a one-piece structure, the display screen 220 has functions of both the touch screen 420 and the display screen 220, and thus there is no need to produce the touch screen 420. The touch screen 420 may be a capacitive touch screen (that is, the touch display panel is a capacitive touch display panel), which includes multiple touch detection electrodes.

The touch detection unit 20 further includes a driving circuit 120.

The driving circuit 120 includes a driving unit 122, which is configured to provide display data to the touch display panel 52 for displaying an image. The diving circuit 122 is configured to provide the display data section by section to the touch display panel 52 for displaying a frame of the image. The driving unit 122 is configured to stop sending the display data to the touch display panel 52 for a predetermined time period between time periods for sending sections of the image data.

The driving circuit 120 further includes a touch detection unit 123, which is configured to perform the touch detection of the touch display panel 52 in the predetermined time period. Specifically, in a case of a capacitive touch display apparatus, the touch detection unit 123 is configured to detect self-capacitance of the touch detection electrodes or detect mutual capacitance between the touch detection electrodes in the predetermined time period.

Since the driving unit 122 sends no display data in the predetermined time period, the interference on touch detection, which is caused by the process of sending display data, can be reduced by performing the touch detection by the touch detection unit 123 in the predetermined time period. Specifically, the driving unit 122 is provided with a timing controller (not shown in FIG. 7), which may control the display data to be sent section by section in displaying a frame of the image and control the driving unit 122 to stop sending the display data to the touch display panel 52 for the predetermined time period between time periods for sending sections of the image data. However, the manner of forming the predetermined time period by sending the display data section by section with the driving unit 122 is not limited herein.

Referring to FIG. 5, it should be noted that the touch display panel 52 (more specifically, the display panel 220) is provided with multiple gate lines 301 arranged in a row direction and multiple data lines 304 arranged in a column direction. The driving unit 122 is configured to drive the gate lines row by row, and send the display data to a column of the data lines 304 after each row of the gate lines 301 is driven, to send each row of the display data. The predetermined time period is at least longer than a time period for sending one row of the display data. The predetermined time period is long enough for the touch detection unit 123 to perform the touch detection at least once.

Optionally, the predetermined time period is longer than a time period for sending ten rows of the display data, in order to ensure the touch detection unit 123 has sufficient time to perform the touch detection, thereby ensuring higher touch detection accuracy of the touch detection unit 123.

Referring to FIG. 7, the driving circuit 120 further includes a main control unit 121 connected to the driving unit 122, and the main control unit 121 is configured to provide image data for image display at a first speed. The diving unit 122 is configured to receive the image data provided by the main control unit, and send the display data to the touch display panel 52 based on the received image data. The diving unit 122 is configured to send the display data to the touch display panel 52 at a second speed higher than the first speed. The driving unit 122 is further configured to form, based on a difference between the second speed and the first speed, the predetermined time period for stopping sending the display data to the touch display panel 52 during a process that the main control unit 121 provides the image data.

It should be noted that, in this embodiment, the predetermined time period is formed because the first speed at which the main control unit 121 sends image data is higher than the second speed at which the driving unit 122 sends the display data, but the present disclosure is not limited thereto. In other embodiments, the speed of the main control unit 121 may be increased, and the main control unit sends the image data section by section to the driving unit 122. A time period between time periods for sending sections of the image data corresponds to the predetermined time period for stop sending the image data. The driving unit 122, after receiving the image data, outputs correspondingly the display data to the touch display panel 52 based on the received image data. In an embodiment where the predetermined time period is formed in other manners, the first speed at which the main control unit 121 sends the image data may be equal to the second speed at which the driving unit 122 sends the display data. In this case, when the main control unit 121 stops sending the image data, the driving unit 122 also stops sending the display data to the touch display panel 52. Accordingly, the touch detection unit 123 performs the touch detection of the touch display panel 52 in the predetermined time period.

The driving unit 122 of the driving circuit 120 is further configured to form a blank time period before or after each frame of image is displayed. According to different designs for the driving circuit, the driving unit 122 may send no signal to the display screen 200 or may send a non-display signal not to be displayed, such as a capacitor pre-charging signal, to the display screen 200 in the blank time period. The touch detection unit 123 is further configured to perform the touch detection of the touch display panel 52 in the blank time period. Since the driving unit 122 sends no display data to the display panel 220 during the blank time period, the interference on touch detection, which is caused by the process of sending the display data, can be reduced by performing the touch detection by the touch detection unit 123 in the blank time period.

The touch detection unit 123 performs the touch detection in the blank time period in addition to the predetermined time period, which may improve the report rate of the touch display apparatus.

Figure 8:
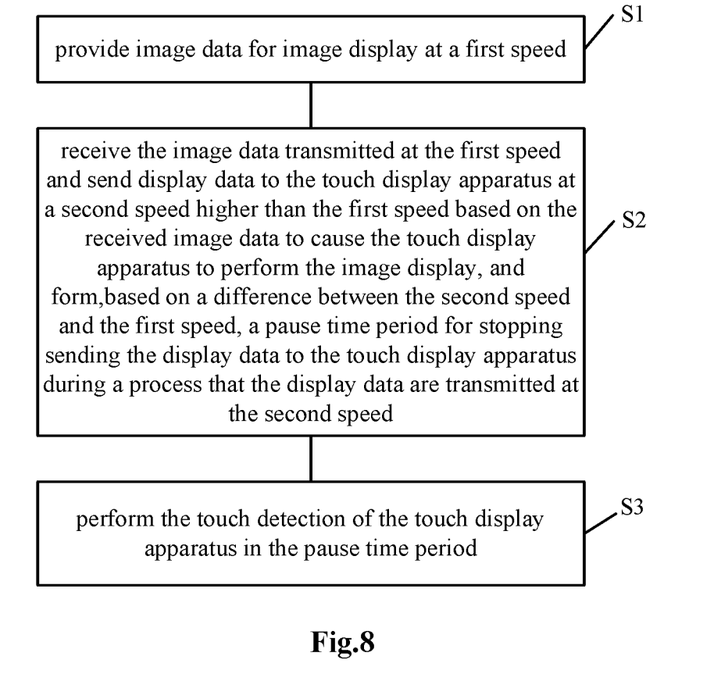
FIG. 8 is a flowchart of a driving method for a touch display apparatus according to an embodiment of the present disclosure.

A driving method for touch display apparatus is further provided according to the present disclosure. Reference is made to FIG. 8, which is a flowchart of a driving method for a touch display apparatus according to an embodiment of the present disclosure. The touch display apparatus is configured to perform touch detection and image display. The driving method includes step S1 to step 3 as follows.

In step S1, image data for image display are provided at a first speed.

In step S2, the image data transmitted at the first speed are received and display data are sent to the touch display apparatus at a second speed higher than the first speed based on the received image data to cause the touch display apparatus to perform the image display. Furthermore, based on a difference between the second speed and the first speed, a pause time period for stopping sending the display data to the touch display apparatus is formed during a process that the display data are transmitted at the second speed.

In step S3, the touch detection of the touch display apparatus is performed in the pause time period.

Since the second speed at which the display data are sent is higher than the first speed at which the image data are received, the pause time period for stopping sending the display data is formed in a case that the display data have been sent to the display screen 200 completely while new image data have not arrived. In the pause time period, the image data are still provided while no display data is sent to the touch display apparatus. Therefore, in the embodiment of performing the touch detection in the pause time period, not only interference of the display drive on the touch detection can be reduced, but also interference of the touch detection on the display drive can be reduced.

In practice, based on the amount of sent display data and a difference between the first speed and the second speed, one or more pause time periods may be formed during a process of displaying a frame of image, so that the touch detection may be performed in the one or more pause time periods during the process of displaying the frame of image. In the embodiment, based on the configuration, the touch detection may be performed several times during the process of displaying a frame of image, thereby improving the report rate.

In order to describe more clearly the technical solution of the driving method for a touch display apparatus according to the embodiment, the steps are described in detail in conjunction with FIG. 1 to FIG. 6.

Step S1 includes providing image data for image display at a first speed.

Specifically, the main control unit (host) 101 may provide the image data for image display at the first speed. The first speed may be a normal data transmission speed of the main control unit 101.

Step S2 includes receiving the image data transmitted at the first speed and sending display data to the touch display panel 50 at a second speed higher than the first speed based on the received image data.

Specifically, the image data may be received at the first speed and may be buffered. Then the display data are sent to the touch display panel 50 at the second speed higher than the first speed based on the buffered image data. The timing of forming the pause time period may be better controlled by the step of buffering.

The touch display panel 50 may include a display screen 200 and a touch screen 400. For example, in a case that 50 rows of image data is buffered in the step of buffering, in displaying a frame of image, the 50 rows of image data of a frame of image are sent at the first speed (v) and buffered at the first speed. And then 50 rows of display data are sent to the display screen 200 at the second speed (3v) which is three times the first speed. Thus, a pause time period having a duration of (the amount of 50 rows of image data/v minus the amount of 50 rows of display data/3v) is formed. The pause time period is sufficient for the touch detection unit 103 to perform the touch detection at least once.

In practice, a notification of starting a pause time period may be generated after the 50 rows of display data buffered in the memory are sent completely. Then the touch detection may be performed based on the notification of starting a pause time period.

It should be noted that, the display screen 200 is provided with multiple gate lines 301 arranged in a row direction and multiple data lines 304 arranged in a column direction. Continue to performing step S2, the step of sending display data to the display screen 200 includes driving the gate lines 301 row by row, and sending the display data to a column of the data lines 304 after each row of the gate lines 301 is driven, to send each row of the display data. The pause time period is at least longer than the time period for sending one row of the display data. In this way, the pause time period is long enough to perform the touch detection of the touch screen 400 at least once.

Optionally, the second speed at which the display data are sent to the display screen 200 equals to an average speed at which multiple rows of the display data are sent. This is because speeds at which different rows of display data are sent vary slightly from each other, and the pause time period can be formed as long as the average speed for sending multiple rows of the display data is higher than the first speed. For example, the second speed equals to an average speed at which 3 rows of display data are sent, which is higher than the first speed, in order to form the pause time period long enough to perform the touch detection at least once.

It should be further noted that, for displaying each frame of image, the step of sending display data to the display screen 200 at a second speed higher than the first speed includes sending display data of each frame of image to the display screen 200 to display the frame of image, and forming a blank time period before or after the frame of image is displayed. According to different designs for a driving circuit, the driving unit may send no signal to the display screen 200 or may send a non-display signal not to be displayed, such as a capacitor pre-charging signal, to the display screen 200 in the blank time period.

Optionally, the driving method further includes performing the touch detection of the touch screen 400 in the blank time period in addition to the pause time period. Since no valid display data to be displayed is sent to the display screen 200 in the blank time period, interference between the touch detection and the display drive may be reduced. Furthermore, since the touch detection of the touch screen may be performed in the blank time period in addition to the pause time period, the report rate is improved.

Step S3 includes performing the touch detection of the touch display panel 50 in the pause time period.

Since no valid display data is sent to the touch display panel 50, interference between the touch detection and the display drive is reduced.

Furthermore, based on the amount of display data to be sent and by setting the first speed and the second speed, multiple pause time periods may be formed during a process of displaying a frame of image. Thus, the touch detection may be performed several times, improving the report rate.

Specifically, the touch screen 400 may be a capacitive touch screen 401 (that is, the touch display panel 50 may a capacitive touch display panel), which includes multiple touch detection electrodes 502. In a case that the touch screen 50 is a self-capacitive touch screen 401, the step of performing the touch detection of the touch screen 400 in the pause time period includes detecting self-capacitance of the touch detection electrodes 402 in the pause time period. In a case that the touch screen 50 is a mutual-capacitive touch screen 501, the step of performing the touch detection of the touch screen 400 in the pause time period includes detecting mutual capacitance between the touch detection electrodes 402. However, the touch screen is not limited to the capacitive touch screen in the present disclosure, and the touch screen may be a touch screen based on other touch detection principles in another embodiment.

Figure 9:
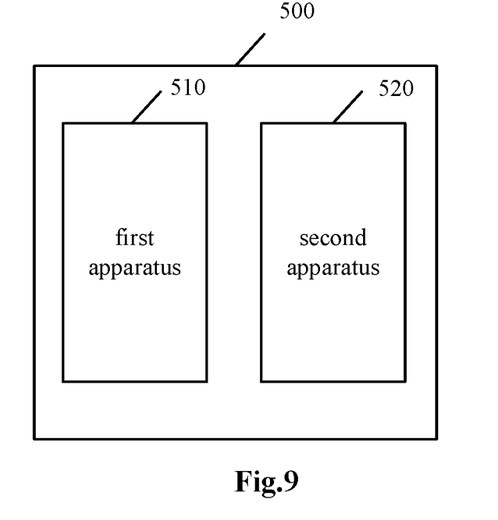
FIG. 9 is a functional block diagram of an electronic device according to an embodiment of the present disclosure.

Furthermore, referring to FIG. 9, an electronic device 500 is provided according to the present disclosure. The electronic device 500 includes a first apparatus 510 and a second apparatus 520 coordinating with the first apparatus 510. The first apparatus 510 is the above-described touch display apparatus 100. The second apparatus 520 may be a housing body for accommodating the first apparatus 510, an apparatus communicating with the first apparatus 510, or the like. The electronic device 500 may be a mobile phone, a panel computer, a table computer, or the like. In a case that the electronic device 500 is a table computer, the second apparatus 520 may be a host or the like.

Although the embodiments are disclosed above, but are not limited thereto. Those skilled in the art may make any amendment or alternation without departing from the spirit and scope of the present disclosure. Therefore, the protection scope of the present disclosure is defined by the appended claims.

The invention claimed is:

1. A driving circuit for a touch display apparatus, wherein the touch display apparatus is configured to perform touch detection and image display, and the touch display apparatus is provided with a plurality of gate lines arranged in a row direction and a plurality of data lines arranged in a column direction, wherein the driving circuit comprises a main control unit, a driving unit and a touch detection unit, and the driving unit is configured to: drive the gate lines row by row; and send display data to a column of the data lines after driving each row of the gate lines, to send each row of the display data, wherein the main control unit is connected to the driving unit and configured to:
send image data section by section to the driving unit at a first speed; and
stop sending the image data to the driving unit for a predetermined time period between time periods for sending sections of the image data;

the driving unit is configured to:
receive the image data sent by the main control unit; and
output the display data corresponding to the received image data section by section to the touch display apparatus at a second speed, wherein the diving unit is configured to stop sending the display data to the touch display apparatus for the predetermined time period between time periods for sending sections of the display data;

the touch detection unit is configured to perform the touch detection of the touch display apparatus in the predetermined time period, wherein the predetermined time period is at least longer than a time period for sending one row of the display data; and the first speed is not higher than the second speed.

2. The driving circuit according to claim 1, wherein the predetermined time period is longer than a time period for sending ten rows of the display data.

3. A touch display apparatus, comprising:
a touch display panel, configured to perform touch detection and image display; and
a driving circuit, configured to drive the touch display panel to perform the touch detection and the image display, wherein the driving circuit is the driving circuit according to claim 1.

4. The touch display apparatus according to claim 3, wherein
the touch display panel is a capacitive touch display panel comprising a plurality of touch detection electrodes; and
the touch detection unit is configured to detect self-capacitance of the touch detection electrodes or detect mutual capacitance between the touch detection electrodes in the predetermined time period.

5. The driving circuit according to claim 1, wherein the driving unit is further configured to form a blank time period before or after each frame of image is displayed; and
the touch detection unit is further configured to perform the touch detection of the touch display apparatus in the blank time period.

6. A driving method for a touch display apparatus, wherein the touch display apparatus is configured to perform touch detection and image display, and the touch display apparatus is provided with a plurality of gate lines arranged in a row direction and a plurality of data lines arranged in a column direction, wherein the gate lines are driven row by row; and after each row of the gate lines is driven, send display data to a column of the data lines, to send each row of the display data, wherein the driving method comprises:
sending image data for image display section by section at a first speed, and stopping sending the image data for a predetermined time period between time periods for sending sections of the image data;
receiving the image data sent at the first speed, outputting the display data corresponding to the received image data section by section to the touch display apparatus at a second speed, and stopping sending the display data to the touch display apparatus for the predetermined time period between time periods for sending sections of the display data; and
performing the touch detection of the touch display apparatus in the predetermined time period, wherein
the predetermined time period is at least longer than a time period for sending one row of the display data; and
the first speed is not higher than the second speed.

7. The driving method according to claim 6, wherein the predetermined time period is longer than a time period for sending ten rows of the display data.

8. The driving circuit according to claim 6, further comprising:
forming a blank time period before or after each frame of image is displayed; and
performing the touch detection of the touch display apparatus in the blank time period.

9. The driving method according to claim 6, wherein the touch display apparatus is a capacitive touch display apparatus comprising a plurality of touch detection electrodes; and
the touch detection unit is configured to detect self-capacitance of the touch detection electrodes or detect mutual capacitance between the touch detection electrodes in the predetermined time period.

* * * * *